US007789750B2

(12) United States Patent
Marks et al.

(10) Patent No.: US 7,789,750 B2
(45) Date of Patent: Sep. 7, 2010

(54) METHOD OF PLAYING A SLOT MACHINE GAME WITH MATCHING SYMBOL COMBINATIONS

(75) Inventors: Daniel Mordecai Marks, Cold Spring, NY (US); Anthony Mark Singer, Ramsey, NJ (US); Howard Mitchell Marks, Scarsdale, NY (US)

(73) Assignee: PTT, LLC, Mahwah, NJ (US)

( * ) Notice: Subject to any disclaimer, the term of this patent is extended or adjusted under 35 U.S.C. 154(b) by 432 days.

(21) Appl. No.: 11/542,901

(22) Filed: Oct. 3, 2006

(65) Prior Publication Data

US 2007/0077980 A1 Apr. 5, 2007

Related U.S. Application Data

(60) Provisional application No. 60/723,024, filed on Oct. 3, 2005.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ........................ 463/20; 273/273; 273/292; 273/138.1; 273/303; 463/13; 463/16; 463/26; 463/27

(58) Field of Classification Search .................... 463/20
See application file for complete search history.

(56) References Cited

U.S. PATENT DOCUMENTS

| | | | | |
|---|---|---|---|---|
| 5,971,849 | A * | 10/1999 | Falciglia | 463/16 |
| 6,604,740 | B1 * | 8/2003 | Singer et al. | 273/292 |
| 2002/0198039 | A1 * | 12/2002 | Marks et al. | 463/20 |
| 2003/0027626 | A1 * | 2/2003 | Marks et al. | 463/20 |
| 2003/0073480 | A1 * | 4/2003 | Thomas et al. | 463/18 |
| 2003/0157981 | A1 * | 8/2003 | Marks et al. | 463/20 |
| 2004/0043809 | A1 * | 3/2004 | Gomez et al. | 463/16 |
| 2004/0048646 | A1 * | 3/2004 | Visocnik | 463/16 |

* cited by examiner

*Primary Examiner*—Johnn M. Hotaling, III
*Assistant Examiner*—Paul A. D'Agostino

(57) ABSTRACT

The present invention includes a variety of methods for wagering upon one or more positions of a symbol matrix and issuing awards based upon the number of symbols in the symbol matrix matching each of the symbols displayed in the wagered upon symbol positions. In a preferred embodiment, players may wager upon any number of the available symbol positions and collect awards for matching each symbol appearing in a wagered upon symbol position with 2 or more other symbols in the symbol matrix.

3 Claims, 3 Drawing Sheets

METHOD OF PLAYING A SLOT MACHINE GAME WITH MATCHING SYMBOL COMBINATIONS

PRIORITY CLAIM

This application is a non-provisional patent application that claims priority to and the benefit of U.S. Provisional Patent Application Ser. No. 60/723,024, filed Oct. 3, 2005, incorporated herein by reference.

COPYRIGHT NOTICE

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF INVENTION

The present invention relates to new methods of wagering upon a slot machine game and collecting awards for winning symbol combinations appearing in the symbol matrix of said game.

BACKGROUND OF THE INVENTION

To play a conventional slot machine, the player deposits money into the machine, sets the wager, and spins the reels. When the reels stop spinning, the player collects credits for winning symbol combinations displayed on the reels, if any, according to a predetermined pay schedule.

While the appearance of conventional slot machines may change from one theme, such as space aliens, to another, such as farm animals, the underlying methods of play—setting the wagering, spinning the reels, collecting awards—remain the same from machine to machine.

Payline wagers and awards are examples of the similar methods used by conventional slot machines. Payline wagers are placed upon one or more of the available paylines. Payline awards issue when predetermined symbol combinations appear in the positions of a wagered payline. Thus, conventional slot machines share the same method of wagering and issuing awards.

The many similarities of conventional slot machines, such as payline wagers and awards, frustrate players, casinos, and manufacturers. Players tire of games using the same methods of play; casinos cannot distinguish their games offerings from other casinos; and manufacturers cannot distinguish their products from other manufacturers.

New methods of playing slot machines, therefore, are required to provide players, casinos, and manufacturers with uniquely entertaining slot machine games, including new ways of placing wagers and collecting awards.

SUMMARY OF THE INVENTION

The present invention includes a variety of methods for wagering upon one or more positions of a symbol matrix and issuing awards based upon the number of symbols in the symbol matrix matching each of the symbols displayed in the wagered upon symbol positions.

In a preferred embodiment, Matrix Match, players may wager upon any number of the available symbol positions and collect awards for matching each symbol appearing in a wagered upon symbol position with 2 or more other symbols in the symbol matrix, as follows:

The player wagers upon symbol positions 1 to N, starting with position 1 and proceeding across the matrix in a predetermined order until finishing with position N. For example, the first five symbol positions wagered upon will always be positions 1, 2, 3, 4, and 5.

The player wagers any amount upon the desired symbol positions, with the same amount wagered upon each symbol position. For example, a player may wager 5 credits on each of 5 symbol positions: 1, 2, 3, 4, and 5.

Each symbol position displays a symbol from the game's symbol set. With each spin, symbols from the symbol set are randomly rearranged and displayed in the symbol positions. The result of each spin generates awards for winning symbol combinations, if any.

Winning symbol combinations are formed by matching a symbol displayed in a wagered upon symbol position with at least 2 other symbols in the symbol matrix. For example, a "7" symbol appearing in symbol position 1 matches the "7" symbols appearing in symbol positions 2, 7 and 14 for a total of four "7" symbols in the symbol matrix.

Awards for winning symbol combinations are calculated by multiplying the payout listed on the award schedule by the amount wagered on the symbol position. For example, four "7" symbols pays 100 credits per each of the 5 credits wagered upon the symbol position, or a total of 500 credits.

Following the calculation of awards for each wagered upon symbol position, the game provides the combined value of all awards to the player. The player may then adjust the wager by changing the number of symbol positions wagered upon and/or the number of credits wagered upon each symbol position.

BRIEF DESCRIPTION OF THE DRAWINGS

The accompanying figures illustrate a preferred embodiment of the present invention.

DESCRIPTION OF A PREFERRED EMBODIMENT

Figure 1:
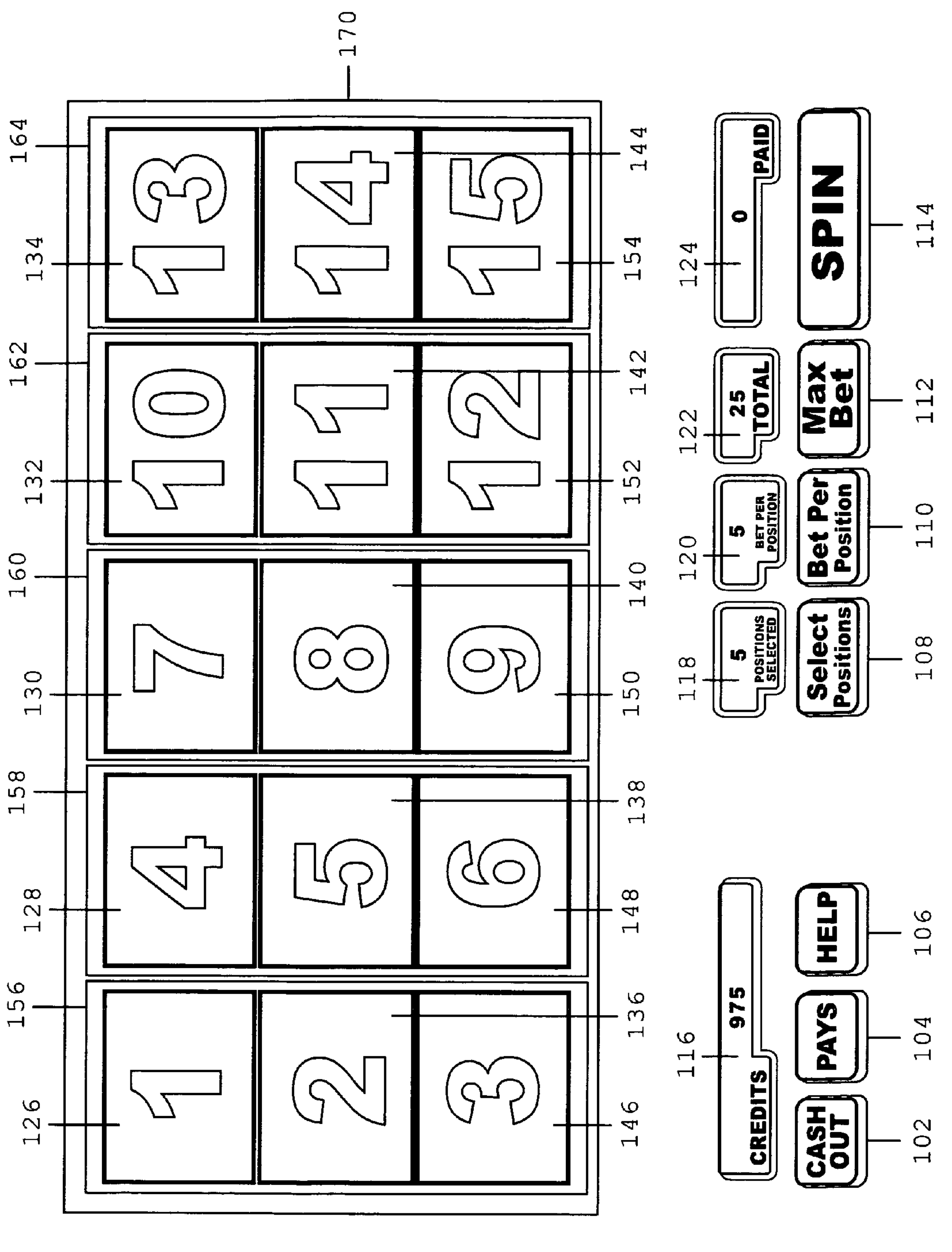
FIG. 1 shows a game screen with 15 symbol positions numbered from 1 to 15.
Figure 2:
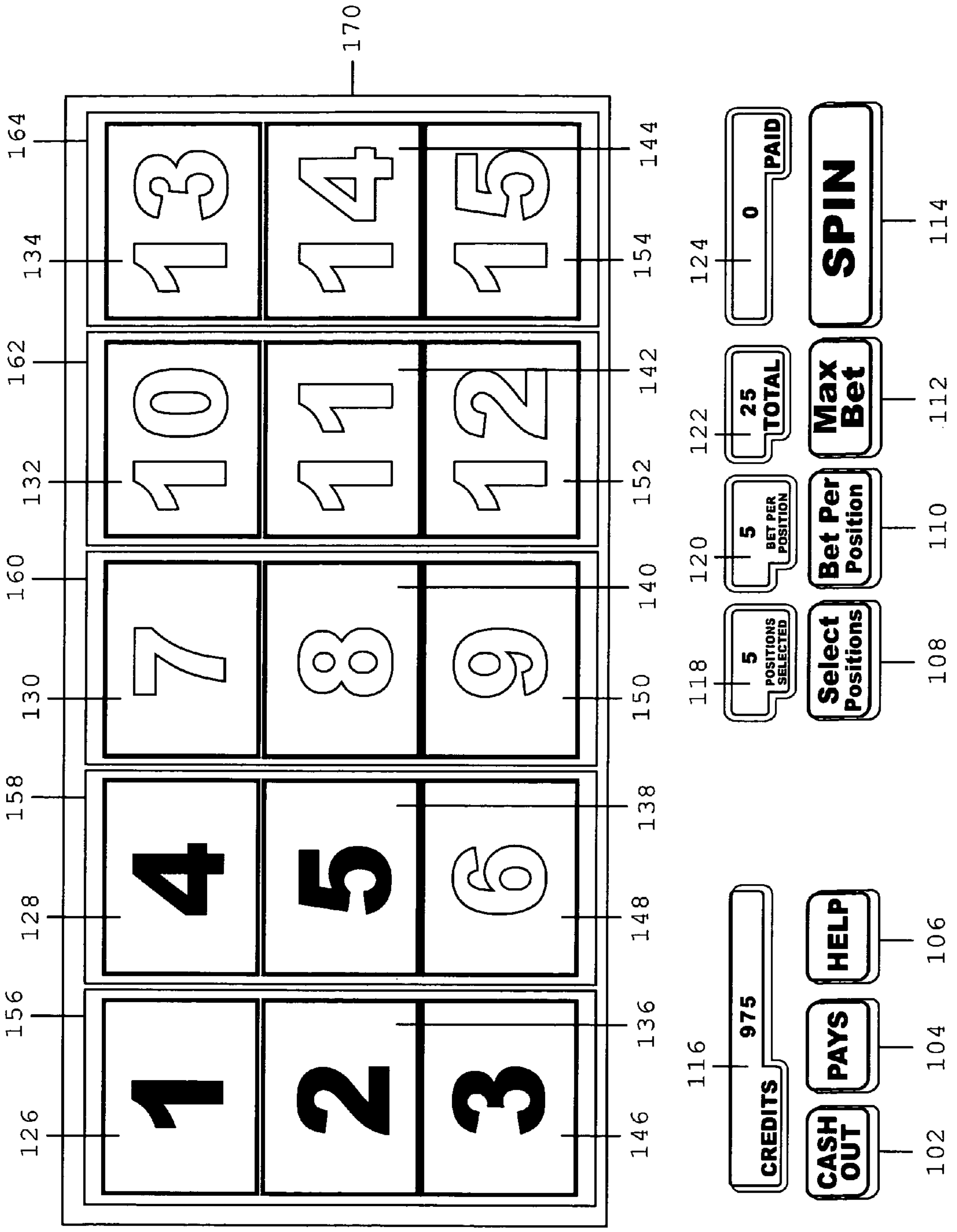
FIG. 2 shows a game screen with wagers on symbol positions 1 to 5.

To play a preferred embodiments of the present invention, the player initializes credits, sets the wager on selected symbol position, spins the reels, and collects awards for matching each symbol appearing in a wagered upon symbol position with 2 or more other symbols in the symbol matrix, as detailed below with reference to FIGS. 1 to 3:

Initialize Credits. The player initializes credits by depositing money in the form of coins, gaming tokens or paper currency into a coin head (not shown) or bill acceptor (not shown). Coins and gaming tokens are collected in a reservoir (not shown) inside the gaming machine; paper currency is collected in the bill acceptor (not shown) inside the gaming machine.

If the coins, gaming tokens or paper currency are validated as authentic, the player accrues the appropriate number of playing credits on the Credit meter 116. More credits may be initialized, if necessary, by additional deposits. Alternatively, any method of initializing credits may be used including debit cards, credit cards, smart cards, or other electronic funds transfers.

Set the Wager. The player sets the wager by selecting one or more symbol positions 126-154 and betting one or more credits on each selected symbol position. The wager is calculated by multiplying the number of selected symbol positions by the bet per symbol position. The total bet amount is displayed on the Total Bet meter 122.

To select symbol positions 126-154, the player uses the Select Symbol Positions button 108 and views the number of selected symbol positions on the Select Symbol Positions meter 118. The player may select any number of symbol positions 126-154 from 1 symbol position to all 15 symbol positions. Alternatively, any number of symbol positions may be selected by the player in any manner.

Symbol positions 126-154 are selected in a predetermined order from the upper left hand corner to the lower right hand corner of symbol matrix 170. In FIG. 1, the order of selection is illustrated by the numbered symbol positions 126-154: the first symbol position 126 is indicated by the number "1"; the second symbol position 136 is indicated by the number "2", and so on until the fifteenth symbol position 154 indicated by the number "15". Alternatively, any number of symbol positions may be selected in any order of activation.

Selected symbol positions are indicated to the player by distinguishing the selected positions from the unselected positions. In FIG. 2, the selected symbol positions 126, 128, 136, 138, 146 are highlighted by bold typeface; the unselected symbol positions 130-134, 140-144, 148-154 are displayed in outlined typeface. Alternatively, selected and unselected symbol positions may be distinguished in any manner.

To set the bet per symbol position, the player uses the Bet Per Symbol Position button 110 and views the amount bet per symbol position on the Bet Per Symbol position meter 120. The same amount is wagered on each symbol position. In FIG. 2, the player bets 5-credits on each of the five selected symbol positions 126, 128, 136, 138, 146. Alternatively, wagers of any amount may be placed on a symbol position, with the same or different amount wagered on each symbol position.

In addition, the player may use the Bet Max button 112 to place the maximum bet per symbol position on all symbol positions. Alternatively, any wager may be assigned a button.

Spin the Reels. The player uses the Spin button 114 to randomly rearrange the symbols displayed in the symbol matrix 170. The symbol matrix 170 contains three symbol positions for each of the five slot reels 156-164 for a total of fifteen symbol positions 126-154. Alternatively, any number of reels with any number of symbol positions may be used.

The slot reels 156-164 spin and randomly stop one reel at-a-time, from left to right, until all five reels have stopped and all fifteen symbol positions 126-154 of the symbol matrix 170 are revealed. Alternatively, any size symbol matrix may be used and any method may be used to rearrange symbols in the symbol matrix.

Matching Symbol Awards. The player receives awards for winning symbol combinations formed by matching a symbol displayed in a wagered upon symbol position with at least 2 other symbols in the symbol matrix, as shown in FIG. 3.

Figure 3:
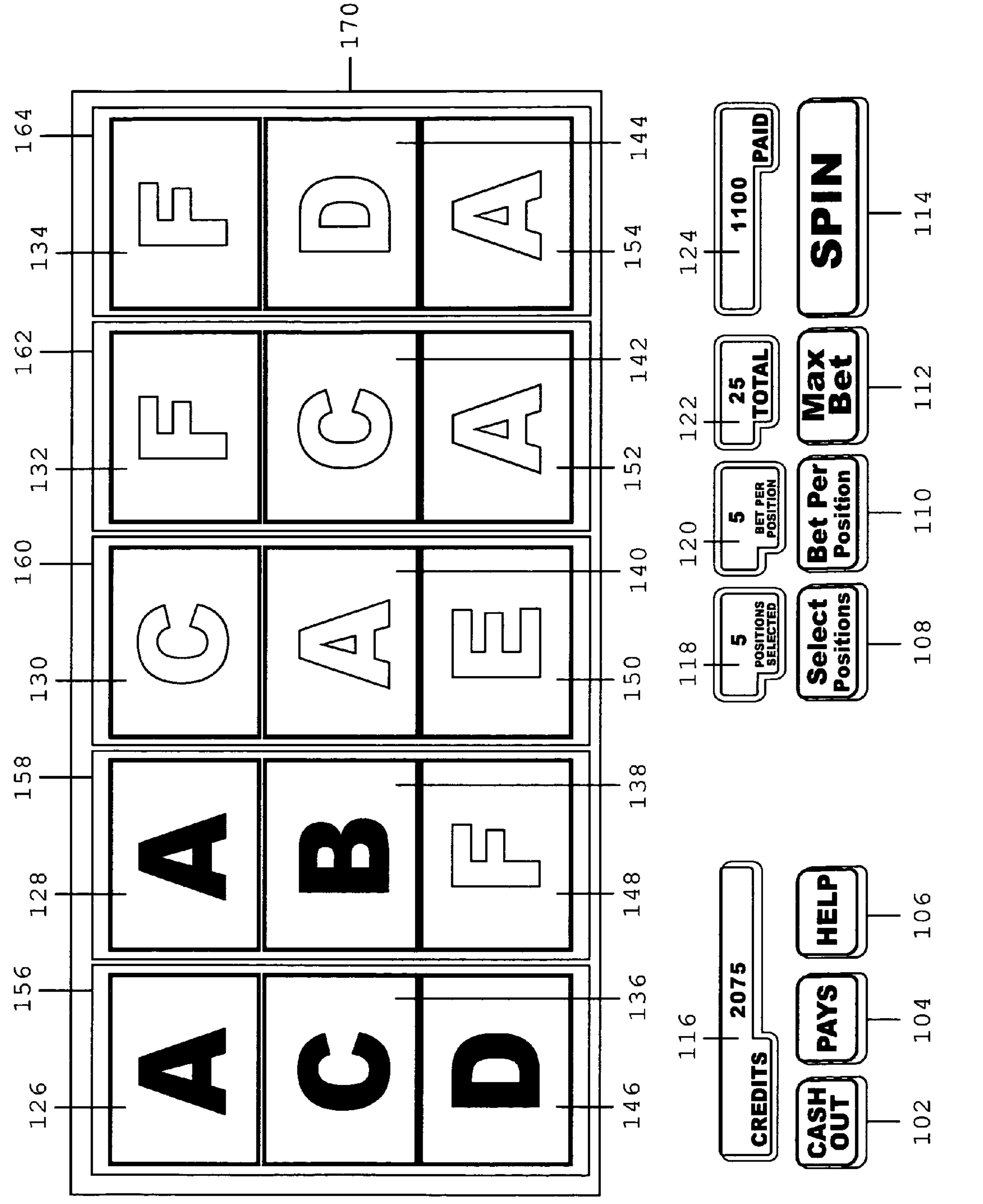
FIG. 3 shows a game screen with winning symbol combinations.

FIG. 3 shows the result of a spin, with the symbol set represented by letters A to F. The letters appearing in wagered upon symbol positions 126, 128, 136, 138, 146 are highlighted in bold typeface. The player's wager of 5 credits on each of 5 symbol positions 126, 128, 136, 138, 146 is indicated on the Selected Symbol Positions 118 and Bet Per Symbol Position 120. The total wager of 25 credit is displayed on the Total Bet 122 meter.

The game determines winning symbol combinations by matching each of the symbols displayed in the wagered upon symbol positions 126, 128, 136, 138, 146 with at least 2 other symbols in the symbol matrix 170. The game then calculates the award value for a winning symbol combination by multiplying the payout listed on a predetermined payout schedule (not shown) by the amount bet on the selected symbol position.

In FIG. 3, the wagered upon symbol positions 126, 128, 136, 138, 146 generate three winning symbol combinations along with the associated award values, as follows:

Symbol "A" appears in the first wagered upon symbol position 126 along with 4 other "A" symbols 128, 140, 152, 154 in the symbol matrix 170. The award for these 5 "A" symbols is calculated by multiplying the payout of 100 credits, according to the predetermined payout schedule (not shown), by the 5 credits wagered on the first selected symbol position 126, or a total award value of 500 credits.

Symbol "C" appears in the second wagered upon symbol position 136 along with 2 other "C" symbols 130, 142 in the symbol matrix 170. The award for these 3 "C" symbols is calculated by multiplying the payout of 20 credits, according to the predetermined payout schedule (not shown), by the 5 credits wagered on the second selected symbol position 136, or a total award value of 100 credits.

Symbol "D" appears in the third wagered upon symbol position 146 along with 1 other "D" symbol 144 in the symbol matrix 170. The payout schedule (not shown) does not include awards for 2 "D" symbols. Thus, game does not issue an award.

Symbol "A" also appears in the fourth wagered upon symbol position 128 along with 4 other "A" symbols 126, 140, 152, 154 in the symbol matrix 170. The award for these 5 "A" symbols is calculated by multiplying the payout of 100 credits, according to the predetermined payout schedule (not shown), by the 5 credits wagered on the fourth selected symbol position 128, or a total award value of 500 credits.

Symbol "B" appears in the fifth wagered upon symbol position 138 without any other "B" symbols in the symbol matrix 170. The payout schedule (not shown) does not include awards for 1 "B" symbol. Thus, the game does not issue an award.

An "E" symbol 150 and 3 "F" symbols 132, 134, 148 also appear in the symbol matrix 170. No "E" or "F" symbols, however, appear in the wagered upon symbol positions 126, 128, 136, 138, 146. Awards only issue based upon symbols displayed in the wagered upon symbol positions. Thus, no awards issue for the "E" or "F" symbols.

The winning symbol combinations appearing in FIG. 3 generate a combined award value of 1100 credits, as shown on the Paid meter 124. The award value is then added to the credit pool for a total of 2075, as shown on the Credits meter 116.

Following the issuance of awards, the player may continue to play the gaming machine or the player may collect the balance of credits by pressing the Cash Out button 102. In addition, the player may press the Help button 106 to view the rules of the game or press the Pays button 104 view the payout schedule.

ALTERNATIVE EMBODIMENTS OF THE INVENTION

In addition to the methods used to operate the preferred embodiment described above, the present invention may be modified in one or more aspects including but not limited to the following alternative embodiments:

In one embodiment, the present invention may use a symbol matrix of any size, such as a symbol matrix with 4 rows and 6 columns.

In another embodiment, the present invention may use any number of symbol positions, such as 18 or 22 symbol positions in the symbol matrix.

In another embodiment, the present invention may increase or decrease the size of the symbol matrix based upon the wager. For example, the symbol matrix may increase from 15 to 20 symbol positions by increasing the number of wagered upon symbol positions from 15 to 20.

In another embodiment, the present invention allows for the selection of symbol positions in any order. For example, the player may select any symbol positions in the symbol matrix.

In another embodiment, the present invention allows for the placement of any wager amount upon the symbol positions. For example, the player may place 5 credits on a first symbol position and 100 credits on another symbol position.

In another embodiment, the present invention provides awards for winning symbol combinations of any length. For example, winning symbol combinations may require at least 5 or more symbols to provide an award.

In another embodiment, the present invention uses a wildcard symbol to help form winning symbol combinations. For example, a wildcard symbol may replace any of the symbols in the symbol set to form winning symbol combination.

In another embodiment, the present invention uses any number of symbols in the symbol set. For example, the symbol set may include 15 different symbols. Further, the symbol set may change based upon the wager amount and/or size of the matrix.

In another embodiment, the present invention may display some or all of the symbols in the symbol set in each of the symbol positions. For example, symbols A to F may appear in all of the symbol positions, but symbols G and H only appear in the first 3 symbol positions.

In another embodiment, the present invention may indicate the selection of symbol positions in any manner. For example, a selected symbol position may be indicated with a golden frame around the edge of the symbol position.

In another embodiment, the present invention may indicate the amount wagered upon each symbol position in any manner. For example, the amount wagered upon a symbol position may be displayed in a corner of the symbol position.

In another embodiment, the present invention may indicate the award amount for each symbol position in any manner. For example, the award amount for a symbol position may be displayed in a corner of the symbol position.

In another embodiment, the present invention may be used as an optional game feature, such as a feature that is purchased with a supplemental wager by the player.

In another embodiment, the present invention may be used as a bonus game feature, such as a feature of a free-spin bonus game.

SCOPE OF THE INVENTION

The many features and advantages of the present invention are apparent from the descriptions of the preferred and alternative embodiments. The present invention, however, is not limited to these particular embodiments, as the invention is capable of being practiced and carried out in various ways. For example, new features may be added to an existing embodiment or features from two or more embodiments may be combined to produce a new embodiment. Further, features mentioned in any embodiment may be interchanged with similar features not mentioned that perform the same or similar functions. And, finally, the phraseology and terminology used to explain the embodiments are only descriptive and should not be regarded as limiting. The patent application and claims, therefore, seek to cover all features and advantages that fall within the true spirit and scope of the present invention.

We claim:

1. A method of operating an electronic gaming device via a processor, comprising:

the processor operable to display a symbol matrix formed by at least one row intersecting with a plurality of columns, wherein said rows and columns include a plurality of symbols;

the processor operable to activate from one to all of the symbol positions in the symbol matrix in a predetermined order by placing a wager upon said symbol positions in the symbol matrix;

the processor operable to randomly rearrange the plurality of symbols in the activated and non-activated symbol positions of the symbol matrix;

the processor operable to display the rearranged symbols in the activated and non-activated symbol positions of the symbol matrix; and the processor operable to determine winning symbol combinations based upon the number of symbols in the symbol matrix matching each of the symbols displayed in the activated symbol positions by:

i) for each activated symbol position, comparing the symbol displayed in said activated symbol position to the symbols displayed in all other activated and non-activated symbol positions of the symbol matrix;

ii) counting the number of symbols displayed in all other activated and non-activated symbol positions of the symbol matrix that match the symbol displayed in said activated symbol position;

iii) issuing an award if the symbol displayed in the said activated symbol position matches two or more symbols displayed in all other activated and non-activated symbol positions of the symbol matrix: and iv) repeated steps i) through iii) for each activated symbol position in the symbol matrix.

2. A method of claim 1 wherein said step of placing a wager upon said symbol positions in the symbol matrix further comprises placing independent wagers on said symbol positions.

3. A method of claim 2 wherein said independent wagers are for different amounts.

* * * * *